Dec. 23, 1952   C. L. CONROY ET AL   2,622,652
APPARATUS FOR ATTACHING HOSE COUPLINGS
Filed Sept. 30, 1949   3 Sheets-Sheet 1

Inventors
Charles L. Conroy
Don F. Stranberg

Attorney

Dec. 23, 1952   C. L. CONROY ET AL   2,622,652
APPARATUS FOR ATTACHING HOSE COUPLINGS
Filed Sept. 30, 1949   3 Sheets-Sheet 2

Inventors
Charles L. Conroy
Don F. Stranberg
By
Attorney

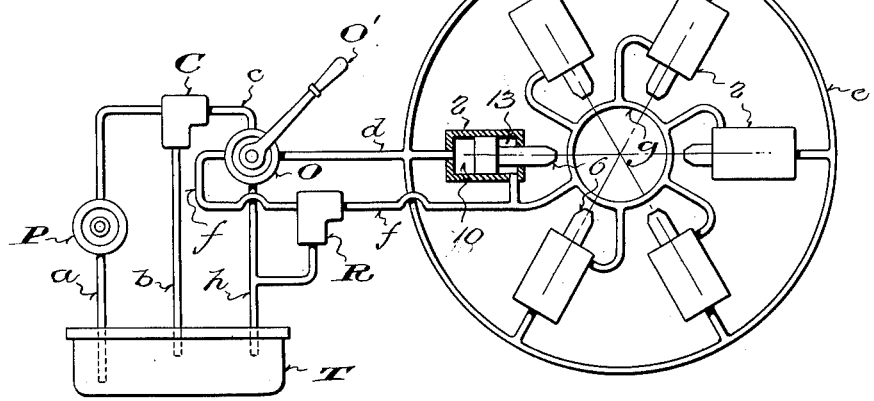
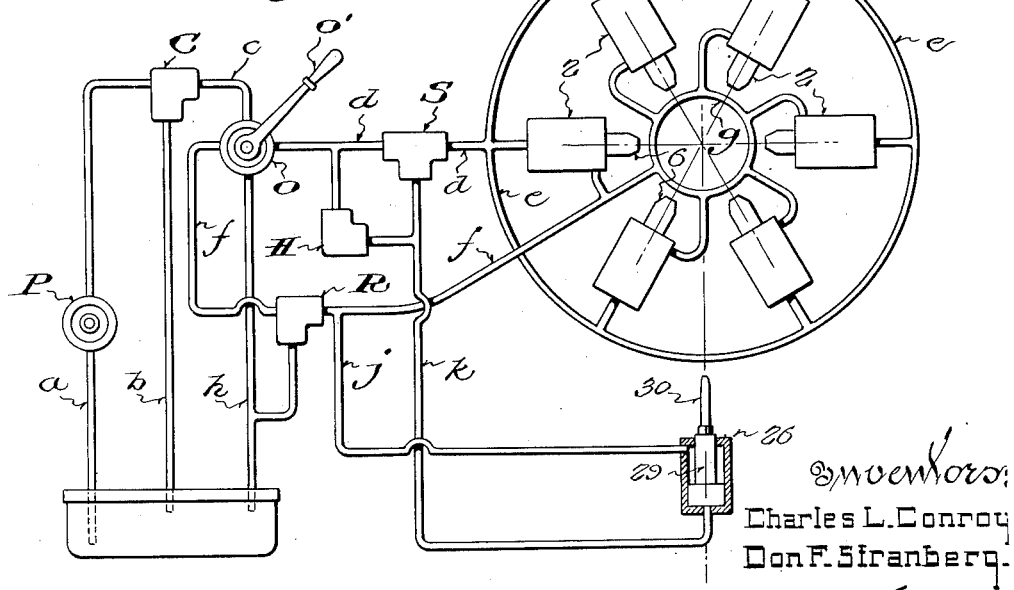

Patented Dec. 23, 1952

2,622,652

UNITED STATES PATENT OFFICE 2,622,652

APPARATUS FOR ATTACHING HOSE COUPLINGS

Charles L. Conroy and Don F. Stranberg, Libertyville, Ill.

Application September 30, 1949, Serial No. 118,874

1 Claim. (Cl. 153—1)

This invention relates to apparatus for permanently attaching conventional couplings on the ends of compressible hose.

At the present time, hose couplings of the type comprising an insert and a contractible cylindrical sleeve are attached in several ways, namely, through contraction of the coupling shell upon the end of the hose by forcing the shell into a split reducing die, or by means of radially contractible swedging dies, either fluid or mechanically actuated. In addition to contraction of the coupling shell, in some instances the insert is first expanded in the manner disclosed in U. S. Letters Patent No. 2,399,790. However, by present conventional apparatus, the extent of contraction of the coupling shell is fixed, either by the diameter of the reducing die when used, or a fixed limit of movement of the radial contractible swedging dies when employed.

Consequently, variations encountered in either the hose or coupling dimensions result in a variation of compression of the hose material between the insert and coupling shell, which is objectionable for several reasons later discussed.

Of the two methods employed, the segmental contractible dies are preferable in that greater production is possible than in the use of a split ring reducing die. Also, it is inconceivable that any means can be devised for varying the extent of contraction of a coupling shell in a reducing die having a fixed orifice.

Therefore, the present invention is directed to an apparatus including radially contractible segmental dies, and has primarily for its object the provision of a novel apparatus for contracting couplings upon the ends of compressible hose, under conditions of constant predetermined pressure to obtain uniformity of compression of the hose material between the coupling insert and shell, and consequently, uniform gripping engagement of the coupling on the hose.

Incidental to the foregoing, a further object of the invention resides in the provision of fluid pressure operated means for radially actuating the segments of a split die to contract a cylindrical coupling shell on the end of a hose, together with pressure actuated means for controlling the extent of pressure exerted upon the coupling and hose material, to prevent damage to the coupling and hose, and insure uniform functional performance.

A still further object of the invention is to provide fluid operated apparatus for initially expanding the coupling insert and then contracting the coupling shell on the end of a hose to further compress the hose on the insert. The expanding and contracting operations being performed in sequence, and the maximum amount of compression being fixed by predetermined fluid pressure within the contracting circuit.

In addition to the foregoing, other objects will appear as the description proceeds, and while the accompanying drawings illustrate one complete physical form of the invention constructed in accordance with the best mode so far devised, it is to be understood that changes in the precise embodiment of the invention are contemplated within the scope of the appended claim.

In the drawings:

Fig. 6 is a diagrammatic view of a typical hydraulic circuit employed in connection with the coupling shell contracting mechanism shown in Figs. 1 and 2; and Fig. 7 is a similar view illustrating a modified circuit employed in that form of the invention shown in Fig. 3.

Figure 1:
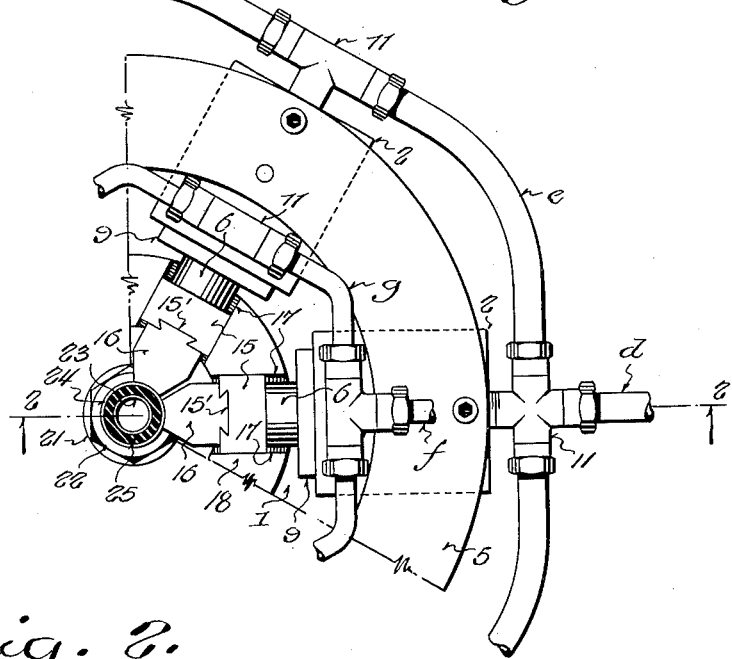
Fig. 1 is a fragmentary plan view of one form of hydraulically operated swedging mechanism incorporated in the present invention.
Figure 2:
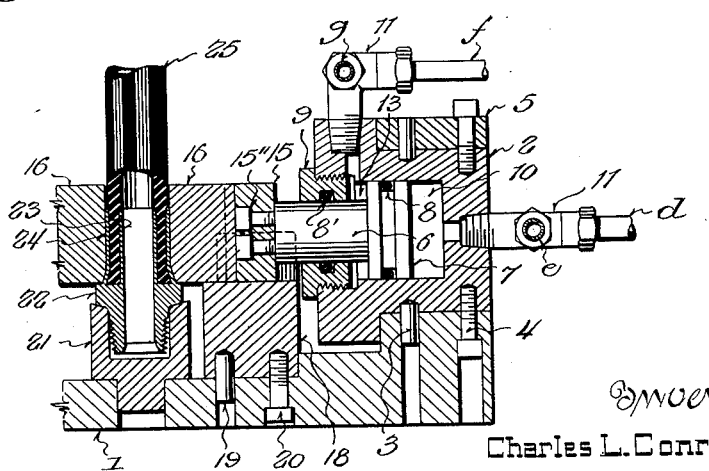
Fig. 2 is a vertical sectional view taken on the line 2—2 of Fig. 1.

Referring now to the accompanying drawings, and more particularly to Figs. 1 and 2, the coupling shell contracting mechanism illustrated comprises a base plate 1 upon which a plurality of hydraulic ram cylinder blocks 2 are radially mounted and secured thereto by pins 3 and machine screws 4. An annular band 5 fastened to the top of the blocks 2 serves to further secure the blocks against operative strain. Each of the cylinder blocks 2 carries a ram 6 provided with a hydraulic piston 7 operable within the cylinder block 2, while a suitable packing ring 8 carried by the piston 7 affords a seal between the same and the wall of the cylinder. A gland 9 threaded into the front face of the cylinder block 2, provides a bearing for the ram 6 and a closure for the hydraulic cylinder. A packing ring 8' contained within an internal annular groove formed in the gland 9 provides a seal for the gland and ram 6.

Pressure fluid is supplied to the advance ends 10 of the hydraulic cylinders through fittings 11, which are connected in series in a common header conduit e, communicating with a fluid line d through one of the fittings 11. The return ends 13 of the hydraulic cylinders are likewise provided with fittings 11 connected with a second header g in communication with a fluid line f connected to one of the fittings.

The rams 6, which travel horizontally upon converging axes are equipped with heads 15, secured to the projected ends of the rams by machine screws 15″, and are provided in their front faces with dove-tailed grooves 15′ for reception of segmental swedging dies 16. The heads 15 are slidably supported and guided in radial ways 17 formed in the top face of a ring 18 fastened upon the base 1 by pins 19 and machine screws 20.

Mounted upon the base 1 on a vertical axis concentric to the converging axes of the rams 6, is a socket chuck 21 for supporting a conventional coupling 22 including an insert 23 and a contractible cylindrical shell 24 for attachment to the end of a flexible hose 25.

Figure 3:
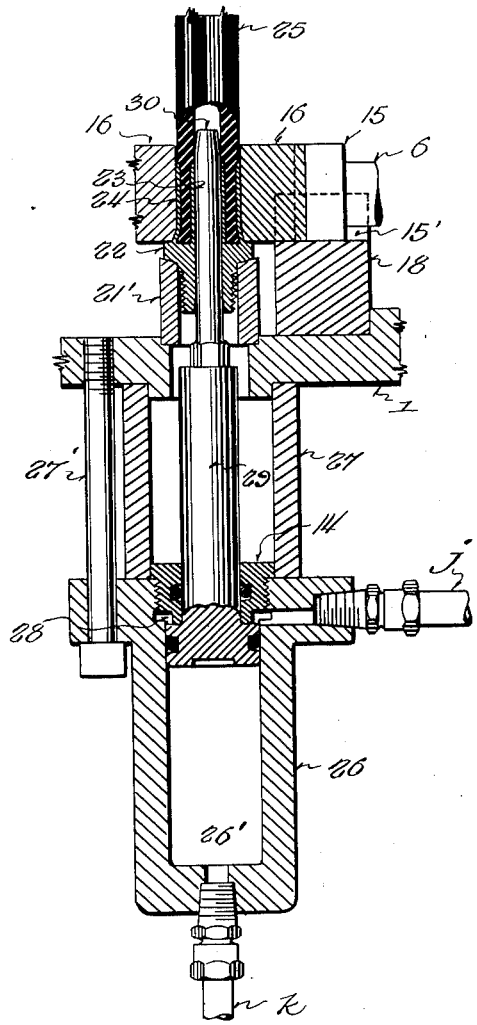
Fig. 3 is a fragmentary sectional view similar to Fig. 2 and illustrating an insert expanding mechanism in combination with the coupling shell contracting dies.

In that form of the invention shown in Fig. 3, in which provision is made for expanding the coupling insert 23, as well as contraction of the coupling shell 24 by the radial swedging dies 16, a hydraulic expanding cylinder 26 is secured against a spacing sleeve 27, abutting the lower face of the base plate 1, by screws 7′. The cylinder 26 is provided with a ram 29, which carries an expanding pin 30 positioned concentrically to the axis of the coupling 22, which in the present instance is supported in a cylindrical chuck 21′ mounted in the base plate 1.

The ram 29 is similar in construction to the rams 6 previously described, and is held within the cylinder 26 in the same manner by a gland 14. In this instance the cylinder 26 is supplied with pressure fluid through a conduit k, while the return end 28 communicates with a supply line j.

With particular reference to Fig. 6, which diagrammatically illustrates a typical hydraulic circuit for operation of that form of the invention shown in Figs. 1 and 2, the pressure fluid is stored in a sump tank or reservoir T. A supply line a communicating with the tank T includes a motor operated pump P, and is connected with a pressure control valve C, which is provided with a return conduit b to the reservoir T and connected to a four-way operating valve O through a line c. In the present instance the valve O is manually actuated by means of a handle O′. However, it is contemplated that the control valve may be automatically operated without departing from the principles of the invention.

Connected with the valve O is a conduit d communicating with the header e, previously described and connected with the advance ends 10 of the hydraulic cylinders 2. Also connected with the valve O is the line f communicating with the return ends 13 of the cylinders 2 in the manner previously described. A relief valve R connected in the line f communicates with a return line h between the valve O and the tank T.

Referring to Fig. 7, the hydraulic circuit diagrammatically shown, is employed in that form of the invention illustrated in Fig. 3, and is similar in most respects to the circuit shown in Fig. 6, the essential difference residing in the provision of a sequence valve S, connected in the line d and communicating with the advance end 27 of the cylinder 26 through the conduit k. The sequence valve S is conventional and of the type fully set forth in United States Letters Patent No. 2,086,295, issued July 6, 1937. The return end 28 of the cylinder 26 is connected with the line f through the conduit j. In this circuit a check valve H provides one way communication between the line d, ahead of the sequence valve S, and the line k when the latter is opened to the return conduit h through the valve O.

From the preceding description it is believed that operation of the radial swedging dies 16, which is the same in both forms of the invention, will be apparent, in that pressure fluid entering the advance ends 10 of the cylinders 2 affects the piston 7 to eject the plunger 6, and because of the radial arrangement of the plungers, their respective dies 16 are moved inwardly upon converging axial lines to engage and contract the coupling shell 24 on the hose 25, and compress the wall of the hose upon the coupling insert 23.

Heretofore, in the above operation no provision has been made for limiting the extent of the contracting pressure nor the amount of compression of the hose material between the coupling shell and insert. Instead it is common practice to employ an excessive amount of fluid pressure for a fixed contraction of the coupling shell against a positive stop or limiting means, irrespective of the amount of compression of the hose material. The same is true in mechanically operated dies.

It, therefore, follows that variation in the dimensions of the coupling parts, or the hose diameter, must result in varying amounts of compression that may be either excessive or insufficient. Both are objectionable in that insufficient compression results in a poor grip of the coupling on the hose, causing leakage or blowoff, while excessive compression is detrimental to both the hose and coupling, resulting in early failure. This is particularly true in wire braid or fabric reinforced hose.

In the present invention, which is designed to overcome the foregoing objections by the provision of fluid pressure control for obtaining predetermined compression of the hose, regardless of variations in its dimension, or those of the coupling shell, the operation is comparatively simple and insures uniformity of attachment and functional performance to a high degree of accuracy.

*Operation*

Referring to that form of the invention illustrated in Figs. 1, 2 and 6, in the normal condition of the apparatus, the radial dies 16 are in expanded position and the operating valve O is set at neutral to provide communication between the fluid line c and the return conduit h. Inasmuch as the control valve C is normally open to allow passage of fluid from the supply line a to the feed line c when the pump P is in operation, pressure fluid is merely circulated from the tank T through the control and operating valves and back to the tank.

After a hose and coupling assembly is placed in the chuck 21, the operating valve O is shifted to provide communication between the lines c and d, and also between the line f and the return conduit h. The pressure fluid is then forced into the advance ends 10 of the ram cylinders 2 through the header e, while fluid in the return ends of the cylinders is forced through the header g, the conduit f, valve O and the return line h, back to the tank T. The fluid pressure thus exerted upon the rams 6 causes the same to be contracted upon converging axial lines to engage and compress the coupling shell 24, and consequently, the end of the hose 25 upon the coupling insert 23 in the manner shown in Fig. 2.

During the contracting operation of the dies 16, obviously, pressure in the lines d and c is built up, and when the same reaches a predetermined capacity, the control valve C, which is pressure actuated, functions to provide communication between the supply line a and the return conduit b to shunt the circulated fluid from the pump P back to the reservoir T.

When crimping of the hose, under predetermined pressure governed by the setting of the valve C is completed, the operator shifts the valve O to open the line a to the return line h, and also provide communication between the line f and the conduit c. The foregoing action of the valve O releases pressure upon the control valve C, and fluid pressure is then circulated through the operating valve and the line f to the return ends 13 of the cylinders 2, through the header g, which returns the swedging dies 16, to normal expanded position, at which point additional pressure created in the line f, because of a fixed limit of return of the rams 6, causes the relief valve R to open and allow the pressure fluid to return to the reservoir through the conduit h, until such time as the operator returns the valve O to its neutral or starting position.

When it is desired to both expand the coupling insert 23 and contract the coupling shell 24, the apparatus shown in Fig. 3, and the circuit diagrammatically illustrated in Fig. 7 are employed. In this application of the invention, it has been found desirable to expand the coupling insert prior to contracting the coupling shell, for the reasons explained in the above noted Letters Patent.

Figure 4:
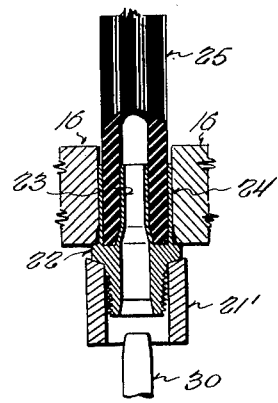
Fig. 4 is a detail sectional view illustrating one step in the operation of the present apparatus.
Figure 5:
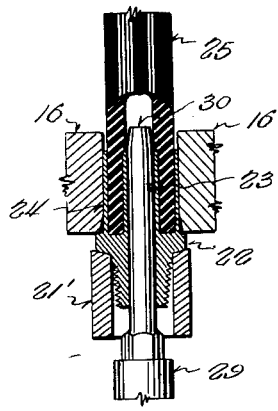
Fig. 5 is a similar view illustrating another step.

Therefore, in the circuit shown in Fig. 7 the first operation occurring upon shifting the operating valve O from its normal position is to contract the swedging dies 16 upon the coupling shell, with merely sufficient pressure to firmly grip and hold the shell without appreciably compressing or contracting the same, as shown in Fig. 4. This action is determined by the pressure actuated sequence valve S, which is set so that when the desired gripping pressure is attained, the sequency valve provides communication between the line d and the conduit k, to supply fluid to the advance end 6' of the expanding cylinder 26, which pressure forces the pin 30 through the restricted coupling insert 23 to expand the same, as shown in Fig. 5. After the expanding ram 29 completes its movement against a positive stop provided by the gland 14, additional pressure is built up in the line k, the conduits d and e, and the advance ends 10 of the ram cylinders, causing the swedging dies 16 to be further contracted upon the coupling shell to compress the end of the hose upon the expanded coupling insert 23 until a predetermined amount of compression is encountered Fig. 3. The control valve C then shunts the pressure fluid back to the reservoir T through the return line b, in the manner described above.

Upon completion of the foregoing expanding and contracting operations, the contracting rams 6 and the expanding ram 29 are returned to their normal positions by shifting the operating valve O to provide communication between the conduit c and the line f, the latter being connected with the return end of the expander cylinder 26 through the line j. When all of the rams have reached the limit of their return movement, excessive fluid pressure is relieved through the relief valve R, and circulated back to the tank T through the return conduit h.

*Summary*

From the above explanation, considered in connection with the accompanying drawings it will be apparent that a novel hydraulic actuated apparatus has been devised for permanent attachment of couplings upon the ends of compressible hose, to the extent that the amount of final compression of both the coupling and hose are constant regardless of the usual production variances in either hose or coupling dimensions.

Also, in that form of the invention designed for both expansion of the coupling insert and contraction of the shell, the sequential operations of the apparatus materially simplify the apparatus and the successive steps to provide maximum economical production.

We claim:

In an apparatus for permanently attaching couplings including a shell and insert upon the ends of compressible hose, a hydraulic actuated tool for expanding the coupling insert in the end of the hose, a plurality of radially contractible swedging dies for successively gripping and then contracting said coupling shell, hydraulic actuated means for operating said swedging dies, a pump, a fluid pressure line connecting said pump with said hydraulic actuated means and said hydraulic actuated tool, a valve in said pressure line for controlling communication between said pump and both said hydraulic actuated tool and said hydraulic actuated means, a pressure responsive sequence valve in said pressure line for controlling flow to said hydraulic actuated tool, said sequence valve normally admitting pressure fluid to said hydraulic actuated means to cause said swedging dies to grip and hold said coupling shell without contracting the same and then divert pressure fluid to said hydraulic actuated tool to project said tool into said coupling insert and expand the same and then support said insert as pressure builds up in the line to further operate said hydraulic actuated means and thereby cause final contraction of said swedging dies, and a pressure responsive valve in said pressure line to limit the extent of pressure exerted upon said hydraulic actuated means at a predetermined pressure below the pressure capacity of said swedging dies.

CHARLES L. CONROY.
DON F. STRANBERG.

REFERENCES CITED

The following references are of record in the file of this patent:

UNITED STATES PATENTS

| Number | Name | Date |
|---|---|---|
| 1,761,521 | Eastman | June 3, 1930 |
| 2,060,860 | Flynt | Nov. 17, 1936 |
| 2,070,720 | Ernst | Feb. 16, 1937 |
| 2,182,663 | Eby et al. | Dec. 5, 1939 |
| 2,211,622 | Hunziker | Aug. 13, 1940 |
| 2,231,278 | Miller | Feb. 11, 1941 |
| 2,250,649 | Pierson | July 29, 1941 |
| 2,254,613 | Matthysse | Sept. 2, 1941 |
| 2,294,640 | Wallace | Sept. 1, 1942 |
| 2,302,115 | Gazey | Nov. 17, 1942 |
| 2,337,366 | Beck | Dec. 21, 1943 |
| 2,399,790 | Conroy | May 7, 1946 |
| 2,502,288 | Streader | Mar. 28, 1950 |
| 2,508,377 | Doerr | May 23, 1950 |

FOREIGN PATENTS

| Number | Country | Date |
|---|---|---|
| 449,805 | Germany | Sept. 22, 1927 |